United States Patent
Bodie et al.

(10) Patent No.: US 6,182,588 B1
(45) Date of Patent: Feb. 6, 2001

(54) HYDRAULIC SYSTEM HAVING BOOST PUMP IN SERIES WITH A PRIMARY PUMP AND A BOOST PUMP DRIVE THEREFOR

(75) Inventors: Cameron D. Bodie; Danick J. Bardi, both of Saskatoon; Blake R. Neudorf, Langham, all of (CA)

(73) Assignee: Flexi-Coil Ltd., Saskatoon (CA)

( * ) Notice: Under 35 U.S.C. 154(b), the term of this patent shall be extended for 0 days.

(21) Appl. No.: 09/301,460

(22) Filed: Apr. 29, 1999

Related U.S. Application Data

(60) Provisional application No. 60/083,825, filed on May 1, 1998.

(51) Int. Cl.$^7$ .................................................. A01C 7/00
(52) U.S. Cl. ......................... 111/174; 111/200; 111/921; 60/486; 60/456; 180/53.61
(58) Field of Search ..................... 111/170, 174, 111/200, 903, 921, 922; 60/486, 456; 180/53.61, 53.6, 53.4

(56) References Cited

U.S. PATENT DOCUMENTS

| | | | |
|---|---|---|---|
| 3,785,157 | * 1/1974 | Kittle et al. ............................... | 60/493 |
| 3,939,656 | * 2/1976 | Goldfein ................................... | 60/381 |
| 4,030,296 | * 6/1977 | Deinlein-Kalb ......................... | 60/486 |
| 4,124,079 | * 11/1978 | Crow ....................................... | 172/114 |
| 4,191,270 | * 3/1980 | Monteith ............................... | 180/53 D |
| 4,214,445 | * 7/1980 | Winsor et al. .......................... | 60/486 |
| 4,352,406 | 10/1982 | Fahrenschon ......................... | 180/308 |
| 4,489,623 | * 12/1984 | Hakkenberg ............................ | 74/378 |
| 4,496,016 | * 1/1985 | Unsworth et al. ...................... | 180/53.6 |
| 5,020,324 | * 6/1991 | MacDonald et al. ................... | 60/430 |
| 5,205,124 | * 4/1993 | Budzich .................................. | 60/456 |
| 5,335,494 | * 8/1994 | Benko et al. ........................ | 60/486 X |
| 5,937,646 | * 8/1999 | Zakula ................................. | 60/486 X |

OTHER PUBLICATIONS

Boggs, *Design News*, PTO Driven Pump, Jul. 20, 1992.
Morgan et al., *Am. Soc. Agr. Eng.*, Meeting Presentation, Dec. 15, 1992, Paper No. 921604.
Friggstad, *Air Force Seeder*, Product Literature.
Friggstad, *Force V Air Seeder*, Product Literature.
Flexi–Coil, *Force V Air Seeder*, Operator's Manual, 1985.
Flexi–Coil, *Force V Air Seeder*, Product Literature
Ezee–On, *Air Seeders*, Product Literature.
*Prairie Farmer's Catalog*, 1985 and 1990.
Prasco, *Super Seeder Ltd.*
Ezee–On, *Model 160 Air Seeder*, Product Literature.

\* cited by examiner

*Primary Examiner*—Victor Batson
(74) *Attorney, Agent, or Firm*—Larry W. Miller; J. William Stader

(57) ABSTRACT

A hydraulic circuit having a boost pump in series with a primary (tractor) hydraulic source provides additional fluid power to operate an aircart fan in an air seeding system for which a tractor hydraulic system does not have enough fluid power capacity. The boost pump raises the pressure of the flow delivered to the fan motor up from that pressure delivered from the tractor to a higher pressure. Tractor pressure is supplied to the boost pump inlet, the boost pump is driven by ground engaging wheels of the aircart, and the resulting flow to the aircart fan motor is increased in pressure by the boost pump.

20 Claims, 9 Drawing Sheets

HYDRAULIC SYSTEM HAVING BOOST PUMP IN SERIES WITH A PRIMARY PUMP AND A BOOST PUMP DRIVE THEREFOR

This application claims benefit to U.S. provisional application Ser. No. 60/083,825 filed May 1, 1998.

BACKGROUND OF THE INVENTION

This invention relates to improvements in hydraulic systems for agricultural implements and to control and drive systems for same.

Air seeders typically comprise a seeding implement and a product carrying aircart. Sometimes additional implements such as a packer are operated in combination with air seeders. Hydraulic systems for aircarts with hydraulic fan drives have large power demands which can be in excess of what a tractor hydraulic system can properly provide. This can be more of a problem when the air seeder is used in combination with other implements having hydraulic systems.

A boost system which provides additional fluid power for aircarts is shown in the related patent specification "Hydraulic System Having Boost Pump in Parallel with a Primary Pump And Boost Pump Drive Therefor" of Russell J. Memory et al. In the Memory et al system the tractor primary pump and a boost pump are arranged in parallel in a hydraulic circuit to supply an aircart fan motor. Flow controls for the system enable one pump to maintain at least a minimum flow to the load when the flow provided by the other pump diminishes. The boost system increases total fluid capacity so that reserve capacity for serving other loads is maintained. In the Memory et al specification prior art related to such hydraulic systems is presented and the benefits of the Boost Pump parallel system are described. The parallel system, however, has some shortcomings which the present invention overcomes.

As noted above, the Memory et al parallel boost system provides additional fluid volume to maintain the aircart fan operation when the tractor primary hydraulic system is insufficient. However, the speed at which the aircart fan operates is also limited by the pressure provided to it. Demand for increased sizes of air seeders requires aircart fans to provide more airflow to deliver the seeding products farther distances across the larger implements.

One prior art system is disclosed in the article titled White Hydraulics PTO Pump System" appearing in Design News, Jul. 20, 1992. The system shown in that article is one in which a tractor system operates as a charge pump for a PTO driven hydraulic pump. The circuit shown is not a series boost system but, rather, the tractor system provides only a charge pressure as is required by gerotor pumps. The circuit shows that the pressure across the motor is the difference between the charge pressure and the PTO pump pressure and the circuit is not a series boost pressure circuit.

SUMMARY OF THE INVENTION

An object of the present invention is to provide a hydraulic drive having a boost series system which boosts the pressure provided by the tractor system and delivers this boosted pressure to a hydraulic motor, e.g. an aircart fan motor. This can provide pressure much higher than can be delivered by the tractor hydraulic system alone and allows the tractor pump to operate at a lower pressure, at which pressure it is capable of delivering more flow.

Accordingly, the invention in one aspect provides a hydraulic drive system adapted to be connected to a primary or main source of hydraulic power including a main pump and a reservoir; said hydraulic drive system comprising: a hydraulic motor for driving a load, a high pressure supply line connected to an inlet of said hydraulic motor and a low pressure return line connected to an outlet of said hydraulic motor, said supply and return lines adapted to be connected to output and return ports respectively of said main source, and a boost pump having an outlet and an inlet in communication with downstream and upstream portions of said supply line respectively, such that when said drive system is connected to said main source, said boost pump is in series with said main pump whereby the boost pump serves to boost the pressure of the flow delivered thereto, a drive for said boost pump, and a fluid control means disposed between the outlet of said boost pump and the inlet of said hydraulic motor to assist in controlling the speed of said hydraulic motor.

The present invention in one preferred form provides a hydraulic system for boosting pressure to a hydraulic motor, e.g. an aircart fan motor and for controlling flow pressure or volume delivered to the motor as a means of motor fan speed control. Specifically, a boost pump is connected in series with an aircart fan motor and tractor primary hydraulic system. The tractor primary system supplies flow to the boost pump and the boost pump increases the pressure. A flow control downstream of the boost pump is controlled to deliver a portion of the boosted pressure flow to the aircart fan motor sufficient to maintain a particular fan speed and any remaining portion is directed back to the inlet side of the boost pump. The flow passing through the fan motor is returned to the tractor hydraulic system where it is filtered and cooled.

Alternatively the invention can also include boost pumps driven by other means, such as a PTO drive pump which is hydraulically connected in place of the ground drive boost pump in the aircart circuit described above.

The control for the flow delivered from the boost pump is preferably a pressure compensated adjustable flow control, or the control might alternatively be a form of pressure control to control the fan motor speed by maintaining or varying the pressure delivered to the aircart fan. The control preferably relieves the excess flow to the inlet side of the boost pump to minimize power loss. However the excess flow may otherwise be relieved to the tractor return depending on the nature of the control valve that is used. Either type of control may be adjusted from a remote location to set the fan speed as desired.

DETAILED DESCRIPTION OF PREFERRED EMBODIMENT

Figure 1:
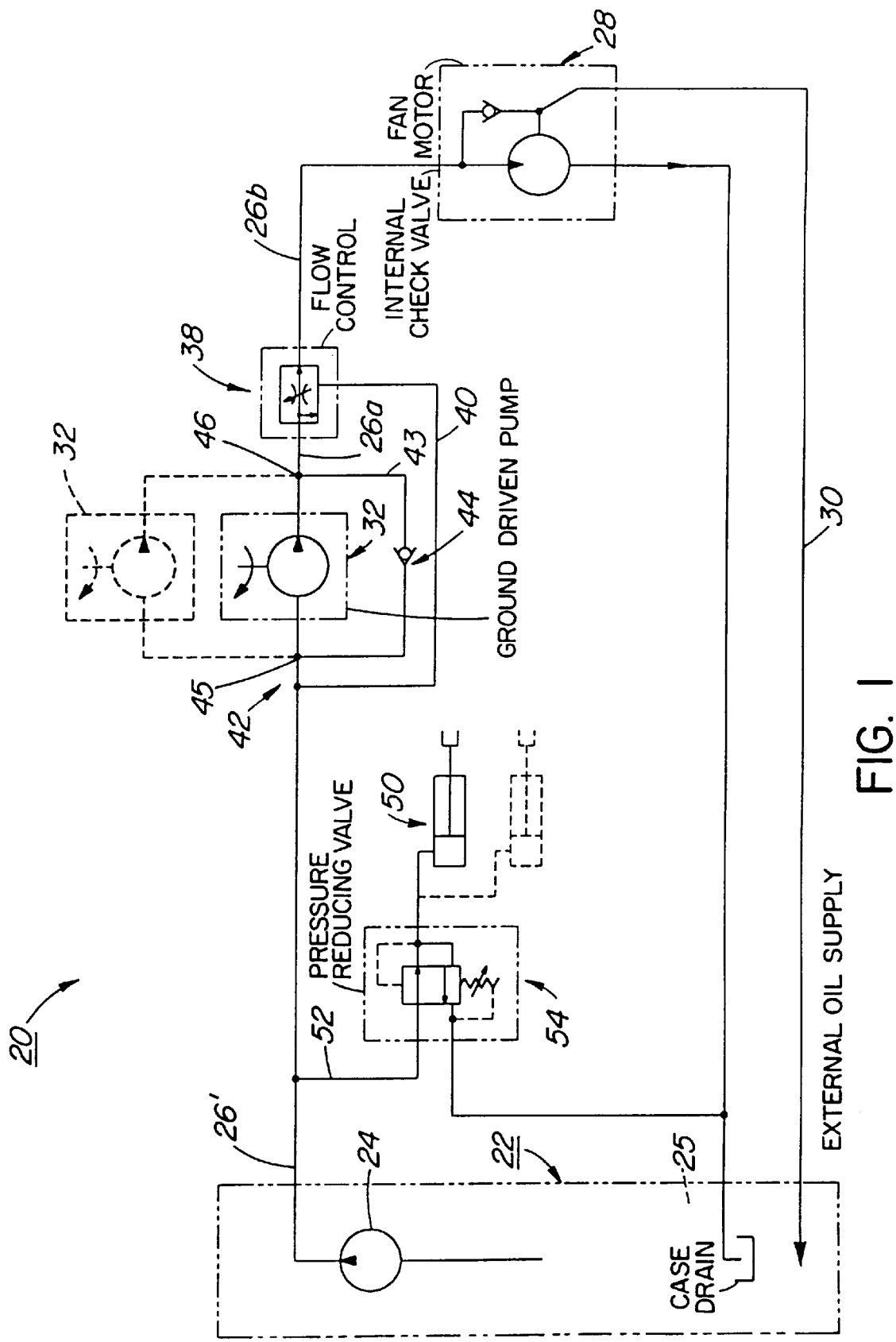
FIG. 1. shows a schematic circuit of the boost pump series system in accordance with an embodiment of the invention.

FIG. 1 shows a preferred form of series boost system hydraulic circuit 20. Hydraulic circuit 20 is connected to a tractor primary hydraulic power source 22 which includes a main pump 24, a reservoir 25 and other components to be noted hereafter. A high pressure supply line 26 extends from the output of primary source 22 to the inlet port of a hydraulic motor 28 which drives an aircart fan (not shown). A low pressure return line 30 extends from the outlet port of motor 28 to the return port and reservoir of primary source 22.

A boost pump 32 is connected in the supply lines 26 in series with the primary source 22. The inlet port of boost pump 32 is connected to the high pressure supply from primary source 22 and the high pressure output side of boost pump 32 is connected to supply line portion 26a which leads into a boost flow control 38 in the form of a pressure compensated adjustable flow control, the latter having one outlet connected to a supply line portion 26b connected to the inlet of fan motor 28 and another outlet connected to return line 40 which is connected at junction 42 to the inlet side of boost pump 32. A by-pass line 43 having check valve 44 can by-pass flow from the primary source 22 around the boost pump 32 as described hereafter. Line 43 is connected to supply line 26, 26a at junctions 45, 46 at the inlet and outlet sides of boost pump 32 respectively. Although the mechanical ground drive for the boost pump 32 will be described hereafter, mention is made here of single-acting hydraulic ram 50, the inlet of which is connected to supply line 26 via ram supply line 52 in which is disposed a pressure reducing valve 54. Ram 50 is connected to engage the boost pump with its ground drive when the (tractor) hydraulic primary source 22 is energized.

Now that the hydraulic circuit of FIG. 1 has been described in general terms, some of the major components of same will be described in further detail, beginning with the primary source 22.

Primary Source (22)

The primary hydraulic power source 22, as noted above, is provided by the tractor. This includes a fluid reservoir, filter, pump, tractor flow controls, and provides for the dissipation of heat from the hydraulic fluid. These components (all well known per se) do not need to be duplicated in the boost system which is connected to the tractor system to obtain that advantage. The tractor main source 22 supply is typically controlled by a relief valve set at 2300–2900 psi.

Boost Pump (38)

The boost pump 38 is a pump such as an Eaton Model 2000 series disc valve geroler-type having a displacement of 18.7 cubic inches/rev. with a pressure rating of 3000 psi continuous.

The boost pump 38 is driven by an aircart ground wheel via a mechanical drive to be described hereafter with reference to FIGS. 4–10. One or more boost pumps (see second pump in phantom in FIG. 1) may be connected in parallel, each driven by separate aircart ground engaging wheels, to provide adequate boost flow. By having pumps connected to two aircart wheels on either side of the aircart one could minimize variation in total boost pump flow as when the aircart travels in a turn in which the wheel on the inside of the turn has reduced rotational speed.

The boost pump 32 may, alternatively, be driven by a tractor power take off (PTO) drive (not shown).

Boost Flow Control (38)

The pressure compensated adjustable flow control 38, as noted above, is used to control the volume of the hydraulic flow which is directed to the fan motor 28. The control 38 is set to give the desired hydraulic motor and fan speed and any excess flow is returned via line 40 to the inlet side of the boost pump. A preferred boost flow control valve is supplied by Brand Hydraulics Model FCR-55-NO. The flow control 38 has an adjustment lever which can be set manually or can be adjusted by an actuator controlled from the tractor cab to set the maximum amount of boost flow that will be directed to the fan motor 28. In this way the operator can control the aircart fan speed on the go. The aircart fan speed is sensed and indicated in the tractor cab by conventional means (not shown) to provide information to the operator for adjusting the flow controls.

Control System

Figure 3:
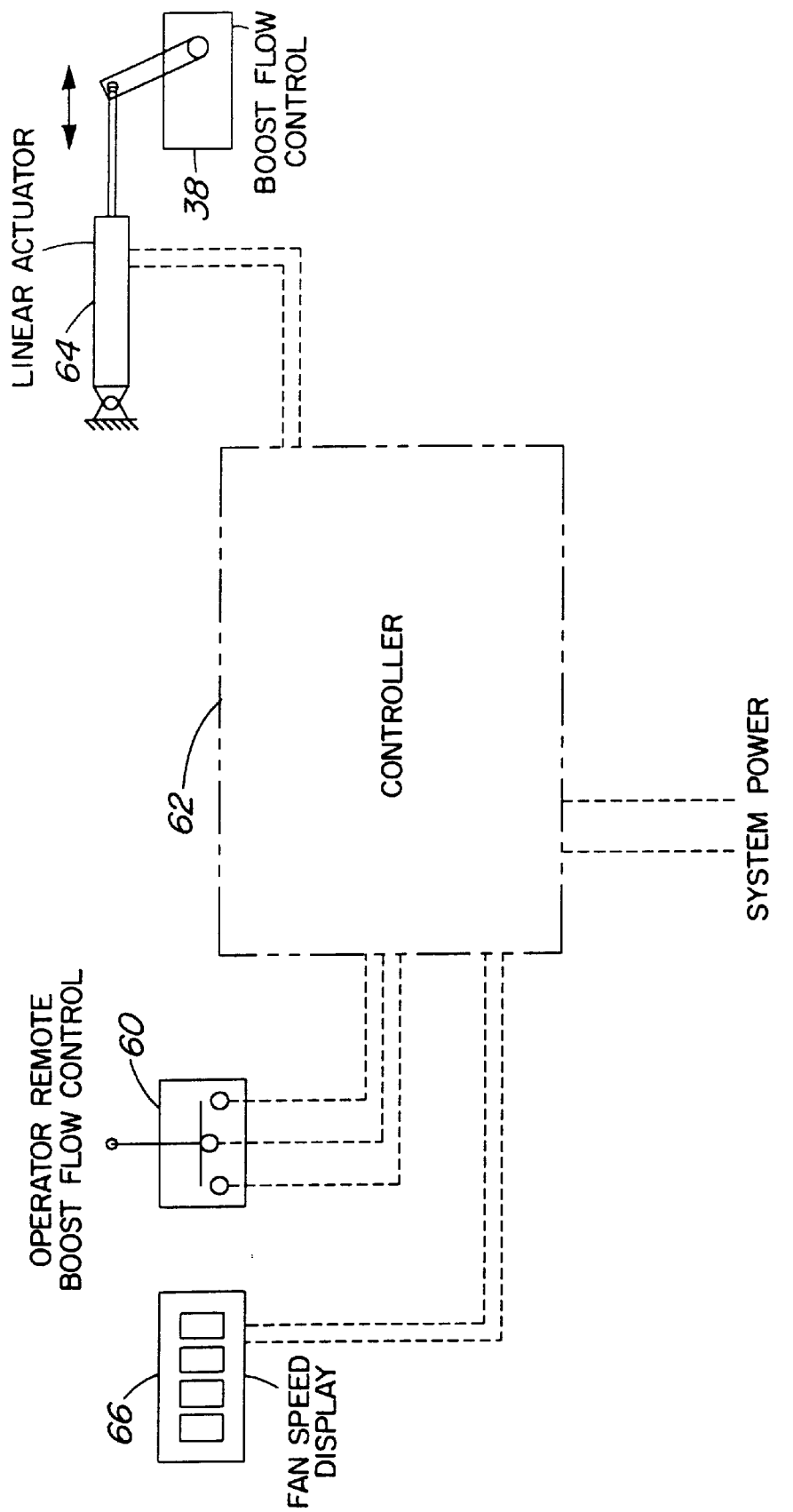
FIG. 3 is a schematic diagram of a control system for the hydraulic circuit.

FIG. 3 shows the control system which allows the operator to make boost flow adjustments from a remote location such as a tractor cab. A three-way switch 60 feeds control signals to controller 62 which has an output connected to linear actuator 64. This in turn moves the control lever of the boost flow control 38 as described previously. Fan speed display 66 coupled with the operator's knowledge of the type and size of equipment and the nature of the operation, e.g. seeding and/or fertilizing, enables the correct setting to be made.

Operation

The operator sets the tractor primary system 22 to provide a base flow to the aircart fan motor circuit. Operation of the aircart fan circuit also engages the boost pump 32 with the ground drive by activating ram 50. Preferably this is done before the air seeding system is in motion to prevent shock to the boost pump drive components which would result from engaging the drive while in motion. The force with which the hydraulic ram 50 engages the boost drive is limited by the above-noted pressure control 54.

The hydraulic flow provided by the tractor primary source 22 bypasses the boost pump 32 through a by-pass line 43 and check valve 44 when the aircart ground speed is less than that which is needed to operate the boost pump 32 at base speed. The tractor source 22 thereby maintains a minimum base fan speed which prevents line blockage when the aircart is moving slow or is stopped. The check valve 44 closes to prevent the boost pump flow from circulating back to the pump inlet when the boost pump speed increases to boost the pressure in supply line 16 above that pressure supplied by the tractor primary source. The boosted pressure flow is controlled by the flow control 38. The flow control 38, as noted above, is a pressure compensated adjustable flow control which is adjusted to deliver a portion of the flow to the aircart fan motor 28, and the remaining portion is returned via return line 40 to junction 42 in line 26 on the inlet side of the boost pump 32. The flow control 32 is adjusted so the portion of flow volume delivered to aircart fan motor 28 operates the fan at the desired speed.

A key advantage of returning the excess boost flow back to the boost pump inlet is that power loss and heat is build up is minimized. The excess flow could alternatively be returned back to the tractor primary source 22; however, the full potential energy in the boosted pressure would be lost in relieving the flow to the return line 30 and much heat would be generated. The flow is thus advantageously returned via the junction 42 connected to the inlet side of the boost pump 32 where the pressure is that provided by the tractor primary source 22. Only part of the total pressure is lost as the flow is relieved and returned to the supply line 26 and much of the energy is retained in the remaining non-returned fluid.

After the flow delivered to the aircart fan motor 28 applies work in operating the motor, the exhaust flow from the fan motor returns back to the tractor primary system via the return line 30. This amount of flow is replaced by the tractor system and delivered to the aircart fan circuit again via the supply line 26. The tractor primary system provides components (well known per se) for cooling and filtration of the fluid in the circuit and those components do not need to be duplicated in the aircart fan motor hydraulic circuit.

Figure 2:
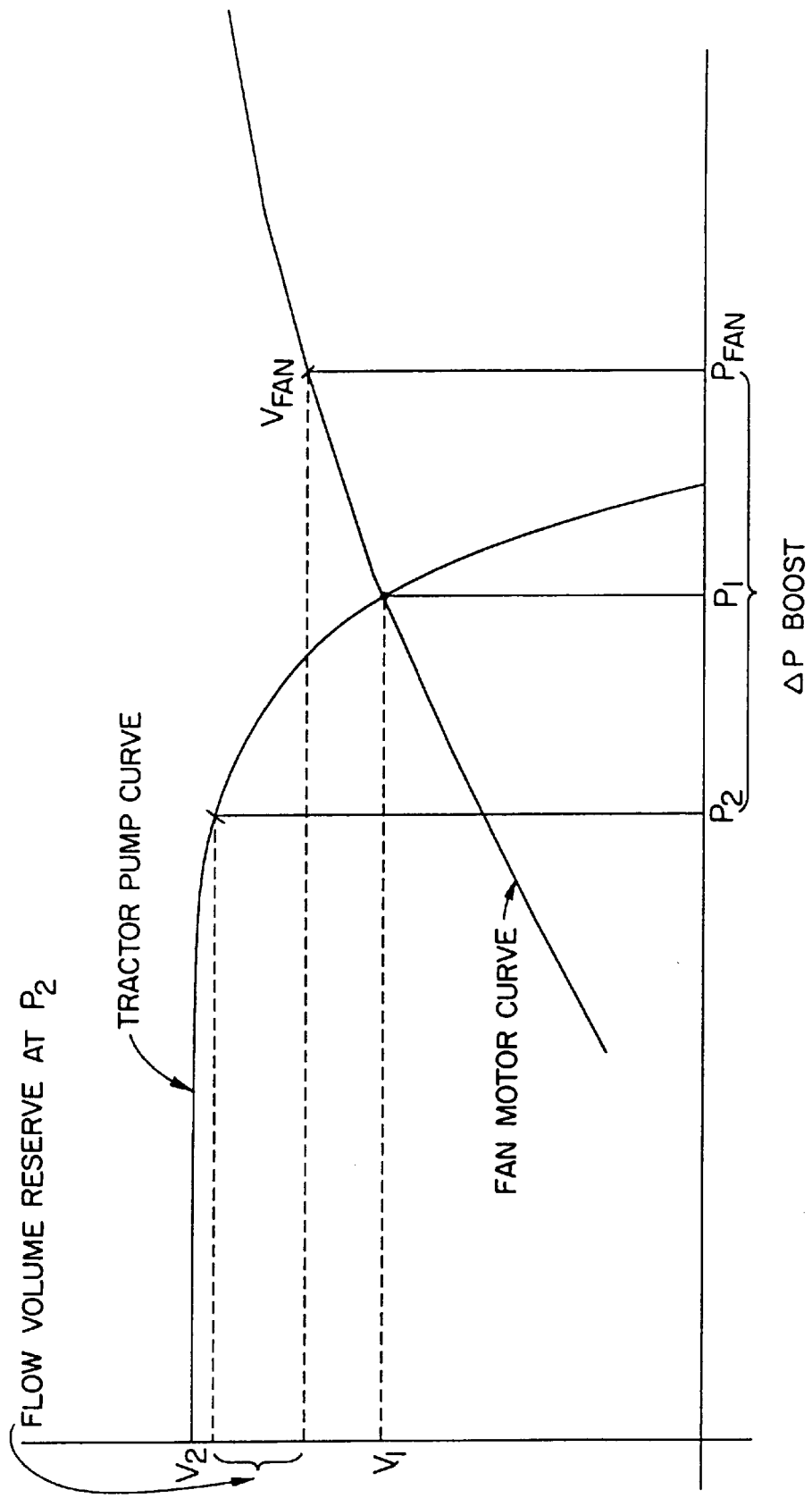
FIG. 2. shows a chart of the tractor pump and aircart fan motor pressure-volume operating curves for the boost pump series pressure boost system.

FIG. 2. demonstrates the advantage of this boost series system. Without a boost pump, an aircart fan may be operated with a flow volume V1 at pressure P1 shown on the tractor pump curve. The tractor system is incapable of operating the fan at the desired speed which requires flow and pressure at Vfan and Pfan. The total tractor pump capacity is required to operate the fan at flow V1.

The boost pump series circuit described above provides additional pressure so the fan may be operated at a higher speed which requires flow Vfan and pressure Pfan. The portion of the required pressure which is delivered by the tractor (P2) is reduced by addition of the boost pump which provides pressure _P boost. At the lower pressure P2, the tractor is able to provide more than enough flow volume V2 and the amount of volume in excess of the required volume Vfan, can be used to operate other circuits in the various implements (not shown) attached to the tractor. Thus the advantages of the boost pump series circuit can be easily recognized.

Figure 4:
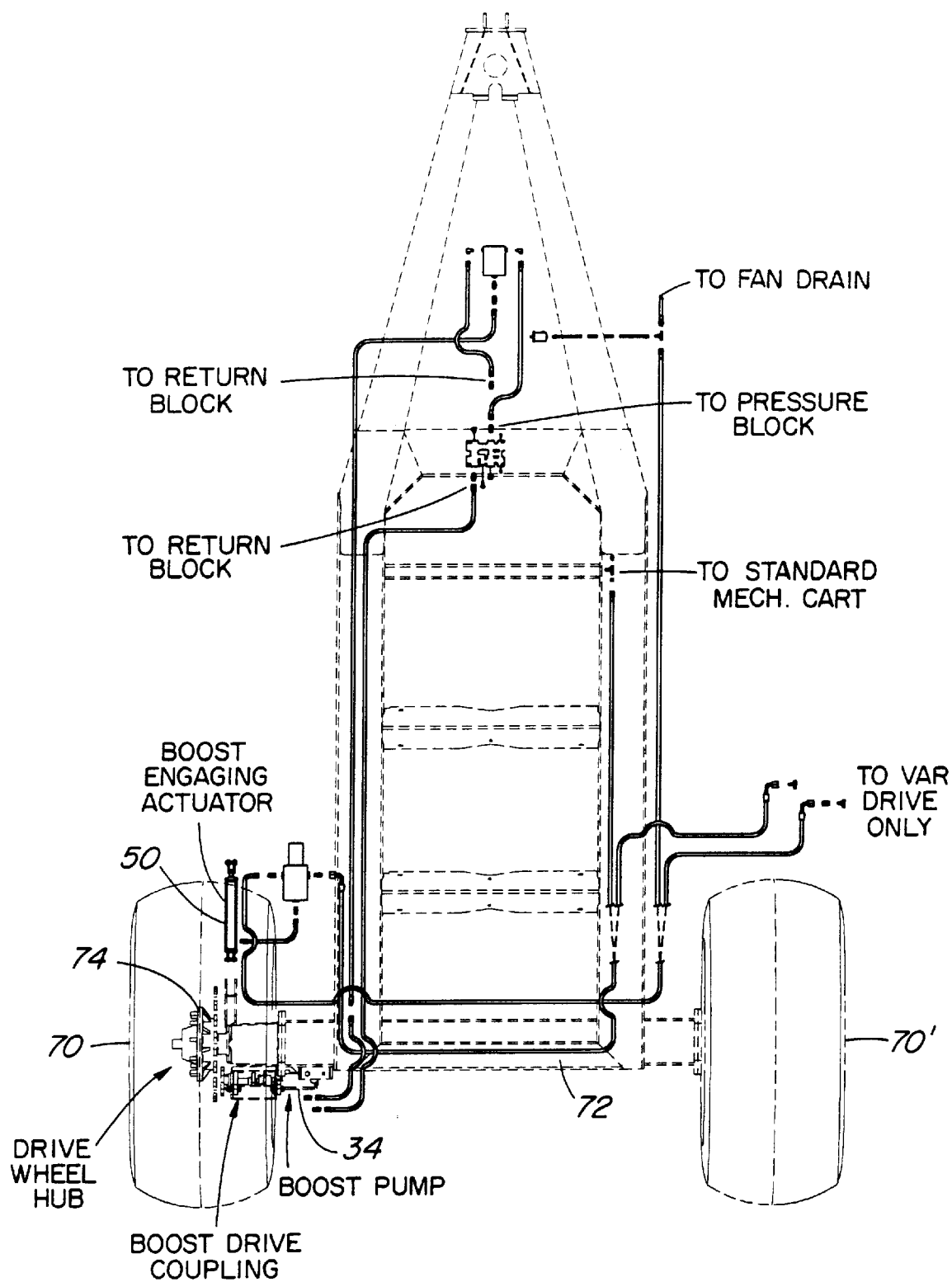
FIG. 4 shows portions of the hydraulic circuit and boost pump ground drive superimposed on an outline of an aircart frame.
Figure 5:
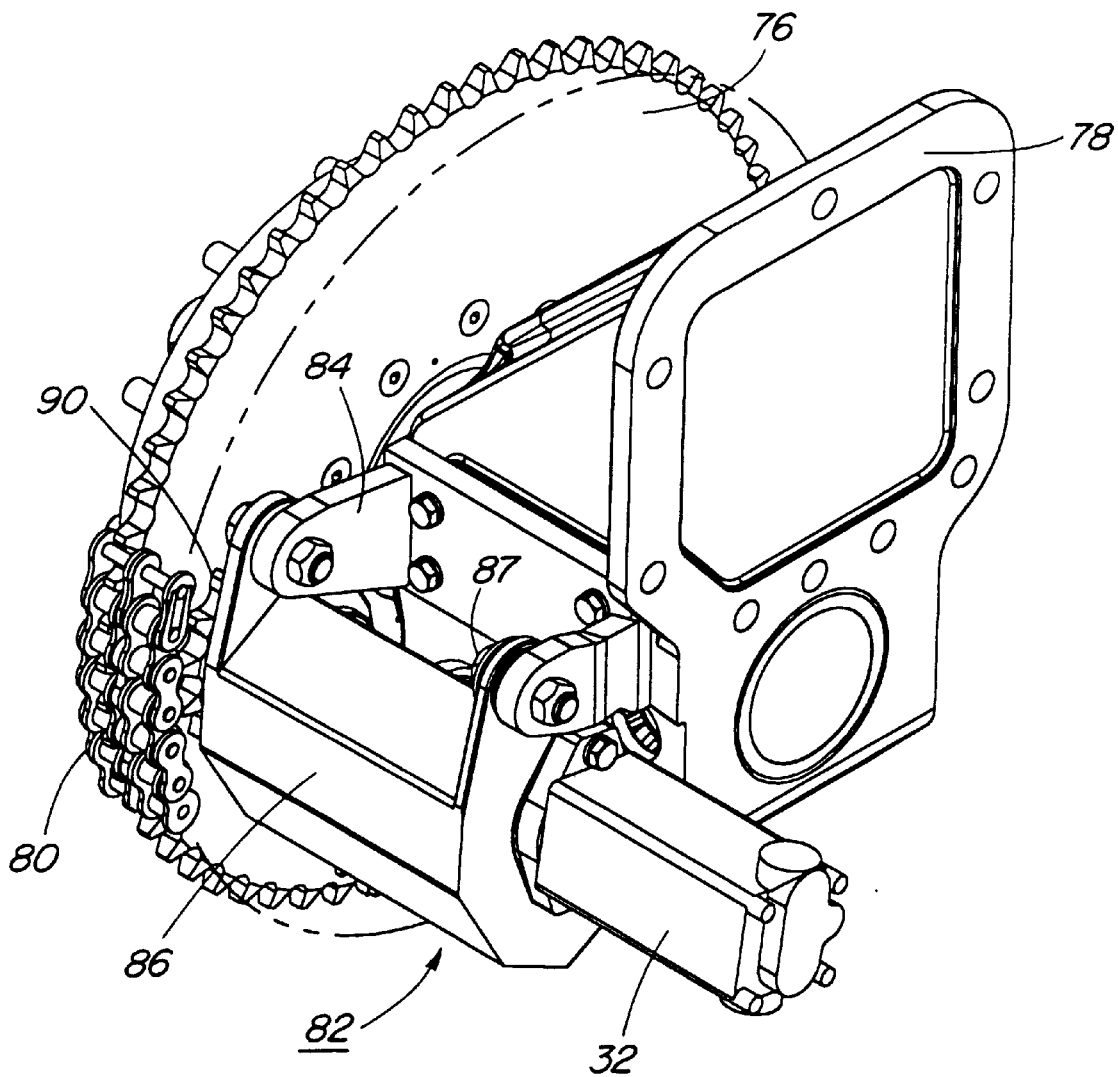
FIG. 5 is a perspective view of the boost pump and its mechanical drive assembly.
Figure 6:
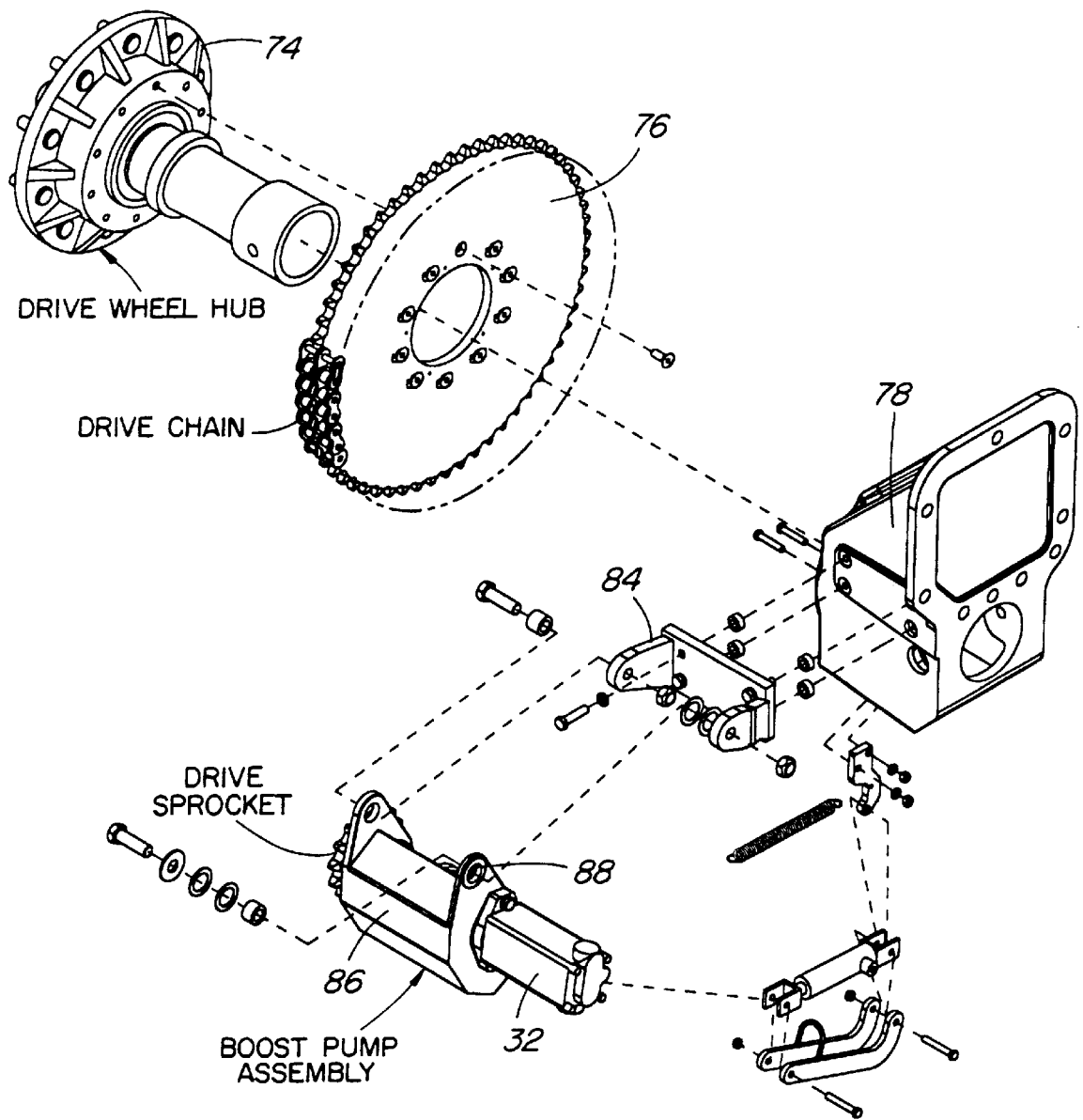
FIG. 6 is an exploded view of the boost pump and drive assembly shown in FIG. 5.

Reference will now be had to FIGS. 4–10 which illustrate the mechanical drive for the boost pump 32. In FIG. 4, a portion of an aircart is shown in phantom with certain of the hydraulic lines. An aircart ground engaging wheel 70 is mounted to axle 72 via wheel hub 74 (FIGS. 5 and 6) and a primary drive sprocket 76 is fixed to wheel hub 74. Axle 72 is journalled in support housing 78 which is bolted to the aircart frame. A dual race roller drive chain 80 is attached snugly around the perimeter of primary sprocket 76 so that the second race extends inwardly from the inner face of sprocket 76 (FIGS. 5 and 6).

A boost pump 32 and its carrier assembly 82 are pivotally mounted to housing 78 by way of a pivot mount 84 fixed to housing 78 and bolted via pivot bolts 87 to upstanding pivot lugs 88 on the boost pump carrier housing 86.

Figure 7:
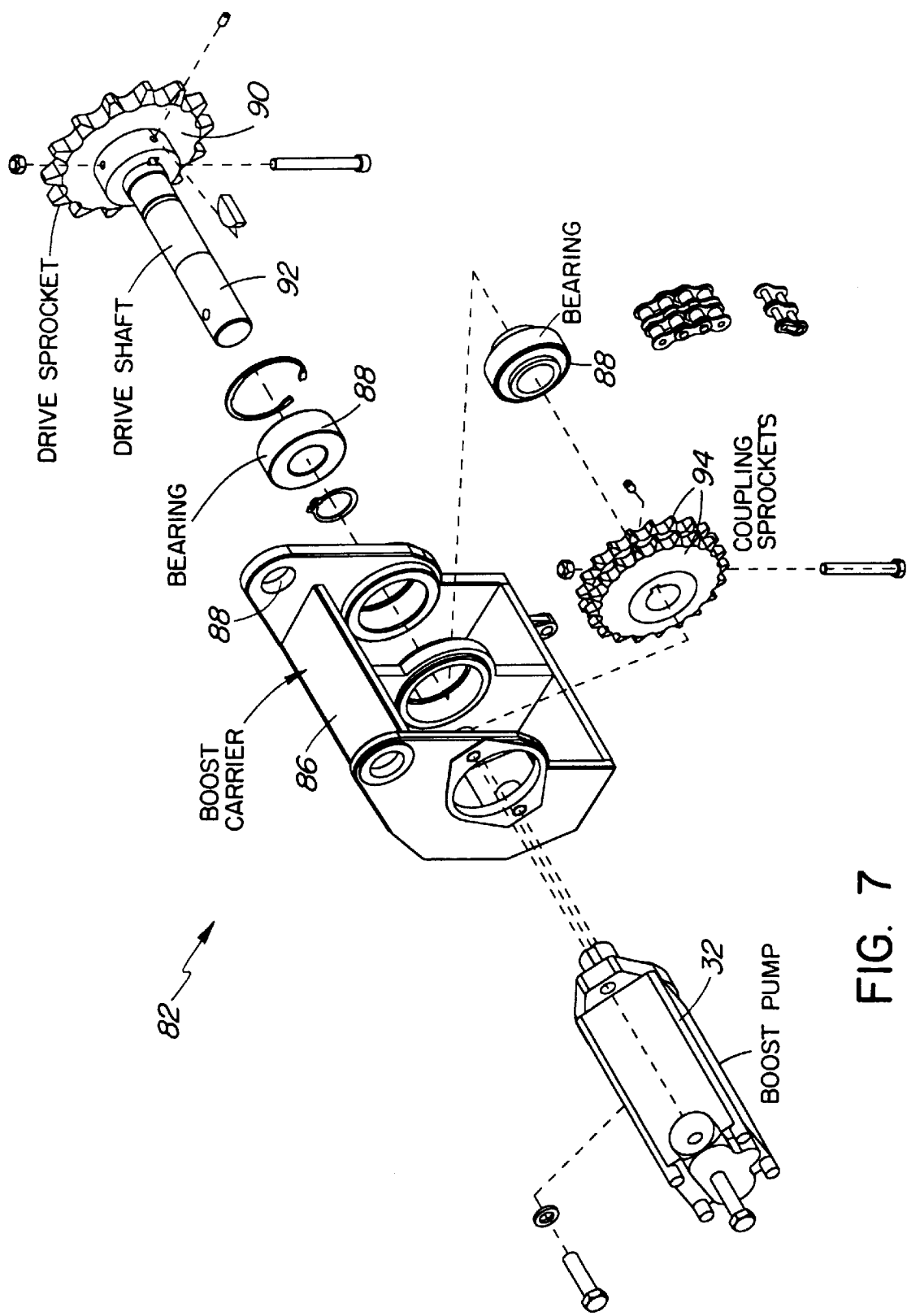
FIG. 7 is an exploded view of the boost pump mounting assembly and drive coupling.

Referring to FIG. 7, the boost pump 32 is mounted in one end of carrier housing 86 and serves to rotate a pump drive sprocket 90 mounted at the opposing end of housing 86 via drive shaft 92 journalled in housing 86 by bearings 88 and via coupling sprockets 94.

Figures 8, 9:
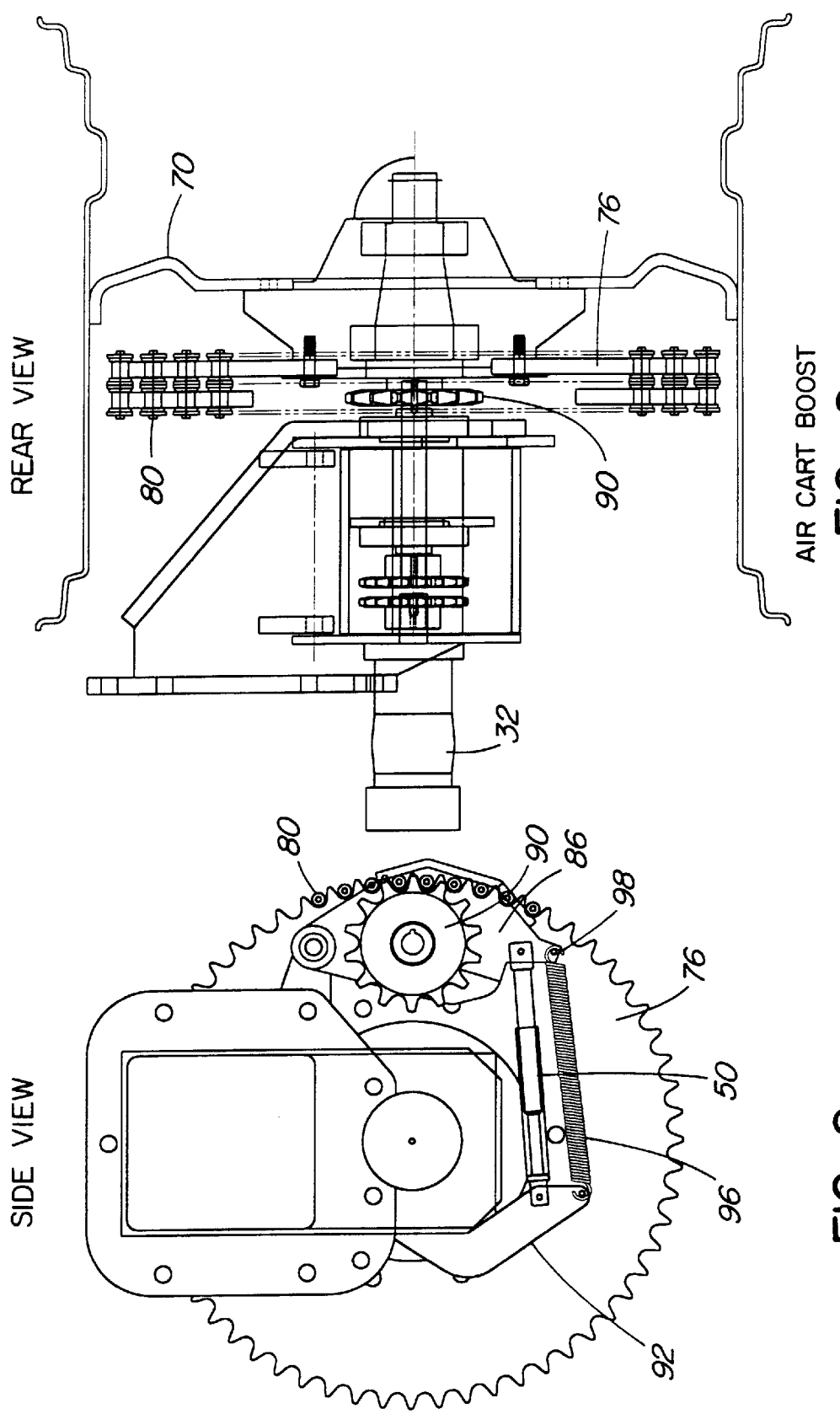
FIGS. 8 and 9 are side and rear elevation views of the boost pump and its mechanical drive assembly.
Figure 10:
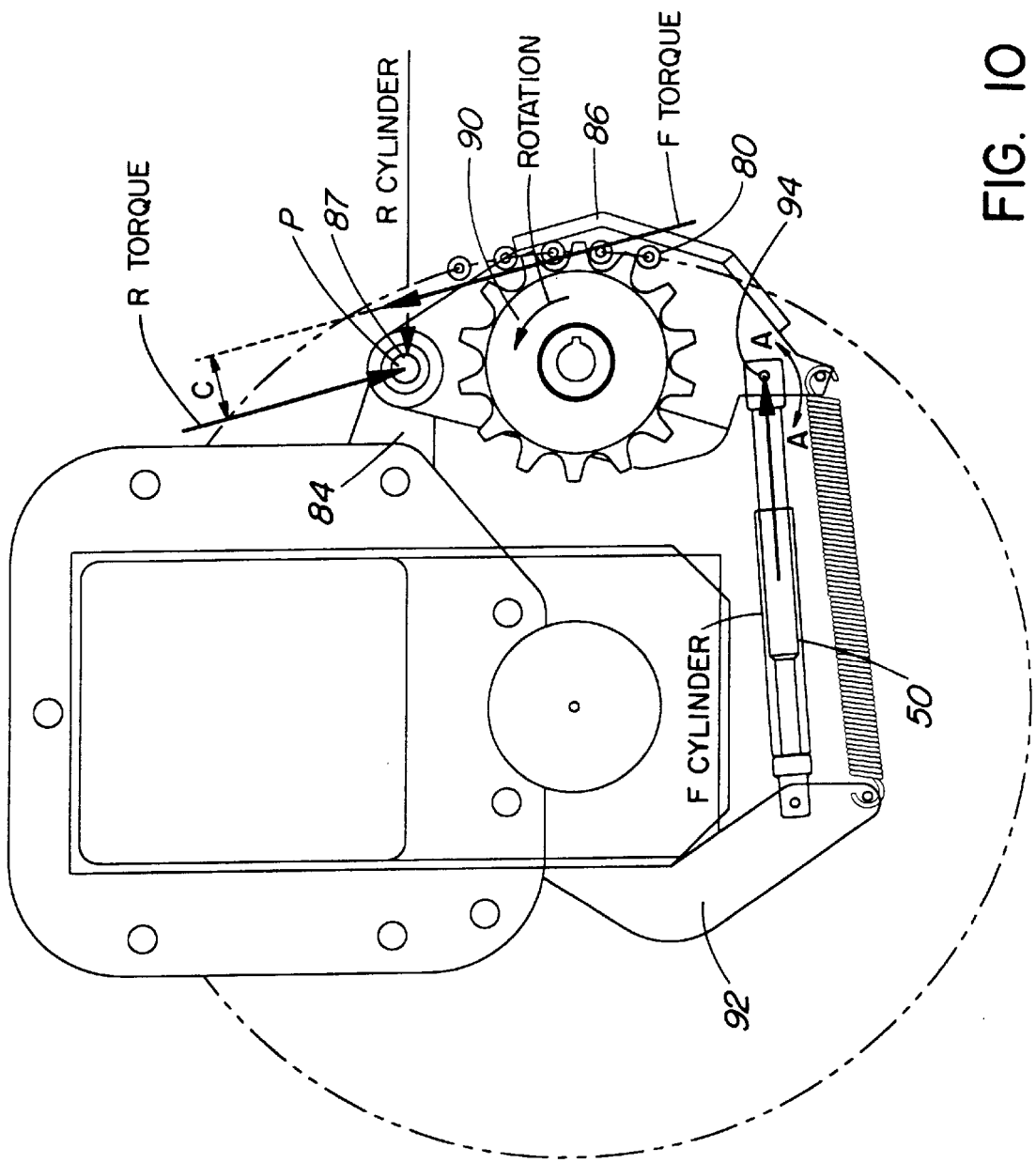
FIG. 10 is a side elevation view of the boost pump drive sprocket and associated assemblies showing the forces exerted by and on it during use.

The smaller boost pump drive sprocket 90 engages with the second race of the drive chain 80 trained around primary sprocket 76 on the inside of the base circle defined by the drive chain 80 (FIGS. 8–10). In order to provide for engagement between the pump drive sprocket 90 and the drive chain 80 on the primary sprocket, an actuating device is provided in the form of the aforementioned hydraulic ram 50 which is connected to the hydraulic circuit described above with reference to FIG. 1. Referring to FIG. 10, the hydraulic ram 50 is interconnected between bracket 92 fixed to housing 78 and a pivot point 94 on a lower extremity of boost carrier housing 86. Hence as hydraulic ram 50 extends and retracts, carrier housing 86 rotates back and forth about the pivot bolts 87 (pivot P) in the direction of arrows A—A thus bringing drive sprocket 90 toward and away from the drive chain 80. Since ram 50 is a single acting ram, a coil tension spring 96 (FIG. 8) is also connected between fixed bracket 92 and the further point 98 on the lower extremity of boost carrier housing 86. Thus, when the hydraulic pressure in the system drops, the spring 96 rotates the boost carrier housing 86 clockwise as seen in FIG. 10 bringing boost pump drive sprocket 90 away from the drive chain 80. When the tractor hydraulics are engaged (see operator step 2 above) the hydraulic pressure extends ram 50 thus bringing sprocket 90 into engagement with the drive chain 80 to rotate the boost pump 32 one the operator puts the tractor and the aircart which it is towing into motion. A "clutching" action is thus provided by the drive system described above. The drive is engaged when the tractor hydraulic system supplies pressure to ram 50 and vice versa. The maximum force exerted by ram 50 is of course determined by the setting of the pressure reducing valve 54.

A key to the boost systems' ability to operate at the proper pressures and flow rates is the selection of size and operating speed of the boost pump 32. Limits to the choices of drive sprocket combinations between the aircart wheel and the pump require high torque forces in driving the pump 32 at the design conditions. The resulting forces can cause high wear in the pump drive component, e.g. sprocket 90 and drive chain 80, and the forces cause the pump drive sprocket 90 to be repelled by the drive chain 80. The pivot mount of the boost pump carrier housing 86 has been positioned to alleviate these problems so that a self-engaging force results to oppose the repelling force. The drive sprocket 90 is then held in engagement with the drive chain 80 with a relatively smaller force from the pump drive activating ram 50. This action is best illustrated in FIG. 10 which shows a side view of the boost pump drive sprocket 90 with the torque force vector F torque offset a distance "C" from the reaction torque vector R torque passing through the pivot P defined by pivot bolts 87. A reaction couple is thus produced about pivot P in a direction which assists the drive sprocket 90's engagement with the drive chain 80, and in the same direction as shown by force vector F cylinder. This self engaging reaction between the drive sprocket 90 and drive chain 80 minimizes operating wear and provides optimum life of the chain and sprocket drive components.

It is seen from the above that the forces which maintain the pump drive sprocket 90 in engagement with chain 80 vary with the drive torque being transmitted so there is little excessive force which would otherwise contribute to wearing of the drive components leading to failure. The life of the drive is extended by the design of the drive because the drive engaging forces are no larger than needed at any time. This is further described below.

The pump drive sprocket 90 is placed in and out of engagement with drive chain 80 by operation of the hydraulic ram 50. However, the ram 50 typically contributes only a minor part of the force necessary to maintain the drive engagement when the drive is operating under maximum load. The majority of the force to maintain the engagement is a resultant of the reaction on the drive carrier housing 86. The pivotal connection of the drive carrier housing 87 is located such that the reaction from the driving forces on the sprocket 90 causes a moment force on the carrier housing 86 to maintain the drive engagement. The new design provides for the engaging force to be contributed in 2 parts, i.e. part from the hydraulic ram 50 and part from the moment reaction on the carrier housing 86. The moment reaction is due to the carrier pivot 87 being located a distance "C" offset from the directional vector F torque which acts on the sprocket as described above.

When the drive is operating at less than peak load, the driving forces are decreased, the reaction is equally decreased and the moment engaging force is decreased. The design thus provides reduced drive engaging forces at off-peak loads so that the drive components wear at a reduced rate, thus extending the life of the boost pump drive.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention, which have been described by way of example; however, other concepts may be employed in other embodiments without departing from the scope of the invention. Those skilled in the art will realize that various modifications and changes may be made while remaining within the spirit and scope of the invention. Hence the invention is not to be limited to the embodiments as described but, rather, the invention encompasses the full range of equivalencies as defined by the appended claims.

Having thus described the invention, what is claimed is:

1. A hydraulic drive system for an agricultural implement adapted to be connected to a prime mover for movement over the ground at a ground speed and having a main source of hydraulic power including a main pump and a reservoir; said hydraulic drive system comprising:
    a hydraulic motor for driving a load, a high pressure supply line connected to an inlet of said hydraulic motor and a low pressure return line connected to an outlet of said hydraulic motor, said supply and return lines adapted to be connected to output and return ports respectively of said main source;
    a boost pump having an outlet and an inlet in communication with downstream and upstream portions of said high pressure supply line respectively, such that when said hydraulic drive system is connected to said main source, said boost pump is in series with said main pump whereby the boost pump serves to boost the pressure of the flow delivered to said hydraulic motor;
    a drive for said boost pump; and
    a pressure compensated adjustable flow control in said downstream portion of the supply line, said flow control being arranged such that any hydraulic fluid in excess of that needed to maintain a desired speed of said hydraulic motor is released from the downstream portion of said supply line prior to reaching the inlet of the hydraulic motor.

2. The hydraulic drive system of claim 1 wherein said flow control has a line connected thereto for returning the released fluid to said supply line at the inlet side of the boost pump.

3. The hydraulic drive system of any one of claim 2 wherein a one-way by-pass line is connected between said upstream and downstream portions of said supply line to permit the main pump output to by-pass said boost pump and to supply fluid to said hydraulic motor to maintain a base speed rate during periods when said boost pump is stopped or being driven slowly.

4. The hydraulic drive system of claim 3 wherein said drive for said boost pump includes a ground engaging wheel supported by said agricultural implement and being connected via a mechanical drive train to said boost pump so that said boost pump is driven at speeds dependent on a ground speed of the agricultural implement.

5. The hydraulic drive system of claim 4 wherein a pair of said boost pumps are disposed in parallel, each boost pump connected to a respective ground engaging wheel located at opposing sides of the machine so as to reduce total boost pump flow variation when the agricultural implement travels in a turn.

6. The hydraulic drive system of claim 4 wherein said train includes a pump drive sprocket connected to said boost pump and drive means engaging said sprocket to effect rotation of same on rotation of said ground engaging wheel, and further means for providing variable drive engaging forces to prevent slippage of said drive means relative to said sprocket, which drive engaging forces are reduced during off-peak loads to reduce wear between said sprocket and drive means.

7. The hydraulic drive system of claim 6 wherein said further means for providing variable drive engaging forces include a pivotal mounting for said boost pump arranged and located such that torque-producing forces exerted on said sprocket by said drive means create moment forces on said boost pump tending to rotate said boost pump about said pivotal mounting whereby to urge said sprocket toward said drive means to increase said drive engaging forces as said torque producing forces increase, and vice versa.

8. The hydraulic drive system of claim 7 wherein said further means for providing variable drive engaging forces also include a hydraulic actuator connected to said boost pump for exerting moment forces thereon, said hydraulic actuator being connected to said supply line such that said hydraulic actuator effects engagement between said drive means and said pump drive sprocket in response to fluid pressure in said supply line, and means for retracting said hydraulic actuator in response to a selected drop in said fluid pressure to disengage said pump drive sprocket from said drive means whereby said boost pump is connected to said drive means when said main source is energized and vice versa.

9. The hydraulic drive system of claim 8 wherein said agricultural implement is an aircart for an air seeder system, said aircart having a fan and said hydraulic motor being connected to said fan for driving operation thereof.

10. The hydraulic drive system of claim 3 wherein said drive for said boost pump includes a power take-off connection operably connectable to said prime mover so that the boost pump may be driven from said prime mover.

11. An air seeder comprising:
    a wheeled frame adapted to be connected to a prime mover for movement over the ground at a ground speed and having a main source of hydraulic power including a main pump and a reservoir;
    a tank supported on said frame to retain a supply of material to be distributed to the ground during operation of said air seeder as said air seeder is being moved over the ground;
    a fan rotatably supported on said frame to create a flow of air;
    distribution means for distributing the material to the ground in a predetermined manner;
    conduit means operably associated with said tank to receive quantities of material therefrom, with said fan to receive a flow of air therefrom and entrain said quantities of material within said flow of air, and with said distribution means to deliver said quantities of material entrained within said flow of air thereto for distribution to the ground;

a hydraulic motor operably connected to said fan selectively effecting rotation thereof to create said flow of air, said hydraulic motor having a high pressure supply line connected to an inlet of said hydraulic motor and a low pressure return line connected to an outlet of said hydraulic motor, said supply and return lines adapted to be connected to output and return ports respectively of said main source of hydraulic power for the circulation of hydraulic fluid through said hydraulic motor;

a boost pump having an outlet and an inlet in communication with downstream and upstream portions of said high pressure supply line respectively, such that said boost pump is in series with said main pump whereby the boost pump serves to boost the pressure of the flow of hydraulic fluid delivered to said hydraulic motor;

a drive for said boost pump; and a fluid control means disposed between the outlet of said boost pump and the inlet of said hydraulic motor to assist in controlling the speed of said hydraulic motor.

12. The air seeder of claim 11 wherein said drive for said boost pump includes a first ground engaging wheel supported by said agricultural implement and being connected via a mechanical drive train to said boost pump so that said boost pump is driven at speeds dependent on a ground speed of the air seeder.

13. The air seeder of claim 12 further comprising a parallel pump disposed in parallel flow communication with said boost pump, said parallel pump also being connected to a second respective ground engaging wheel, said first and second ground engaging wheels being located at opposing sides of the air seeder so as to reduce total pump flow variation when the air seeder travels in a turn.

14. The air seeder of claim 12 wherein said train includes a pump drive sprocket connected to said boost pump and drive means engaging said sprocket to effect rotation of same on rotation of said ground engaging wheel, and further means for providing variable drive engaging forces to prevent slippage of said drive means relative to said sprocket, which drive engaging forces are reduced during off-peak loads to reduce wear between said sprocket and drive means.

15. The air seeder of claim 14 wherein said further means for providing variable drive engaging forces includes:

a pivotal mounting for said boost pump arranged and located such that torque-producing forces exerted on said sprocket by said drive means create moment forces on said boost pump tending to rotate said boost pump about said pivotal mounting thereby origing said sprocket toward said drive means to increase said drive engaging forces as said torque producing forces increase; and a hydraulic actuator connected to said boost pump for exerting moment forces thereon, said hydraulic actuator being connected to said supply line such that said hydraulic actuator effects engagement between said drive means and said pump drive sprocket in response to fluid pressure in said supply line, and means for retracting said hydraulic actuator in response to a selected drop in said fluid pressure to disengage said pump drive sprocket from said drive means whereby said boost pump is connected to said drive means when said main source of hydraulic power is energized.

16. In an air seeder having a wheeled frame adapted to be connected to a prime mover for movement over the ground at a ground speed and including a main source of hydraulic power including a main pump and a reservoir; a tank supported on said frame to retain a supply of material to be distributed to the ground during operation of said air seeder as said air seeder is being moved over the ground; a fan rotatably supported on said frame to create a flow of air; distribution means for distributing the material to the ground in a predetermined manner; conduit means receiving said flow of air from said fan and interconnecting said tank, to receive quantities of material therefrom and entrain said quantities of material within said flow of air, and said distribution means to deliver said quantities of material entrained within said flow of air thereto for distribution to the ground; and a hydraulic motor operably connected to said fan for selectively effecting rotation thereof to create said flow of air, said hydraulic motor having a high pressure supply line connected to an inlet of said hydraulic motor and a low pressure return line connected to an outlet of said hydraulic motor, said supply and return lines adapted to be connected to output and return ports respectively of said main source of hydraulic power for the circulation of hydraulic fluid through said hydraulic motor, the improvement comprising:

a boost pump having an outlet and an inlet in communication with downstream and upstream portions of said high pressure supply line respectively, such that said boost pump is in series with said main pump whereby the boost pump serves to boost the pressure of the flow of hydraulic fluid delivered to said hydraulic motor, said boost pump having a drive mechanism including a first ground engaging wheel supported by said agricultural implement and being connected via a mechanical drive train to said boost pump so that said boost pump is driven at speeds dependent on a ground speed of the agricultural machine.

17. The air seeder of claim 16 wherein said mechanical drive train includes a pump drive sprocket connected to said boost pump and drive means engaging said sprocket to effect rotation of same on rotation of said ground engaging wheel, and further means for providing variable drive engaging forces to prevent slippage of said drive means relative to said sprocket, which drive engaging forces are reduced during off-peak loads to reduce wear between said sprocket and drive means.

18. The air seeder of claim 16 further comprising a fluid control means disposed between the outlet of said boost pump and the inlet of said hydraulic motor to assist in controlling the speed of said hydraulic motor.

19. The air seeder of claim 18 wherein said fluid control means is a pressure compensated adjustable flow control in said downstream portion of the supply line and arranged such that any hydraulic fluid in excess of that needed to maintain a desired speed of said hydraulic motor is released from the downstream portion of said supply line prior to reaching the inlet of the hydraulic motor.

20. The air seeder of claim 19 wherein said flow control means has a line connected thereto for returning the released fluid to said supply line at the inlet side of the boost pump, a one-way by-pass line being connected between said upstream and downstream portions of said supply line to permit the main pump output to by-pass said boost pump and to supply fluid to said hydraulic motor to maintain a base speed rate during periods when said boost pump is stopped or being driven slowly.

* * * * *